Figure 12:
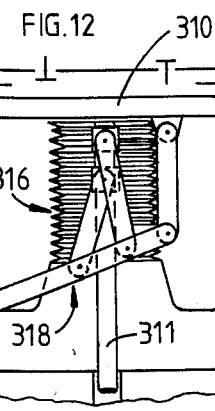

United States Patent [19]

Braun

[11] Patent Number: 4,556,369

[45] Date of Patent: * Dec. 3, 1985

[54] BELLOWS SEAL

[76] Inventor: Anton Braun, 6421 Warren Ave. S., Minneapolis, Minn. 55435

[*] Notice: The portion of the term of this patent subsequent to Jan. 3, 2001 has been disclaimed.

[21] Appl. No.: 407,816

[22] Filed: Aug. 13, 1982

[51] Int. Cl.$^4$ ............................................. F04B 39/04
[52] U.S. Cl. .................................... 417/437; 74/18.2; 277/3; 277/28; 417/375
[58] Field of Search .......................... 277/3, 27, 28, 29; 74/18.2; 417/437

[56] References Cited

U.S. PATENT DOCUMENTS

| | | | |
|---|---|---|---|
| 3,568,436 | 3/1971 | Heffner et al. | 277/28 |
| 3,875,806 | 4/1975 | Brewster | 74/18.2 |
| 4,424,008 | 1/1984 | Braun | 417/375 |

Primary Examiner—Leonard E. Smith
Attorney, Agent, or Firm—Alan M. Staubly

[57] ABSTRACT

A bellows seal apparatus for use in compressors or the like which has pump means arranged and controlled to maintain a desired pressure differential between the inside and outside surfaces of the bellows. It also has a driving mechanism having a connection with a movable end of the bellows and an additional connection or connections with said bellows at unequally spaced points intermediate to the ends of the bellows to provide the least maximum stress levels in the bellows convolutions of each and thus the maximum life expectancy for the seal. The driving mechanism may take many forms but is so designed that it will elongate and contract each section of the bellows a distance depending upon the dynamically caused stresses in each section and the composition of and the number of bellows convolutions in each section.

18 Claims, 16 Drawing Figures

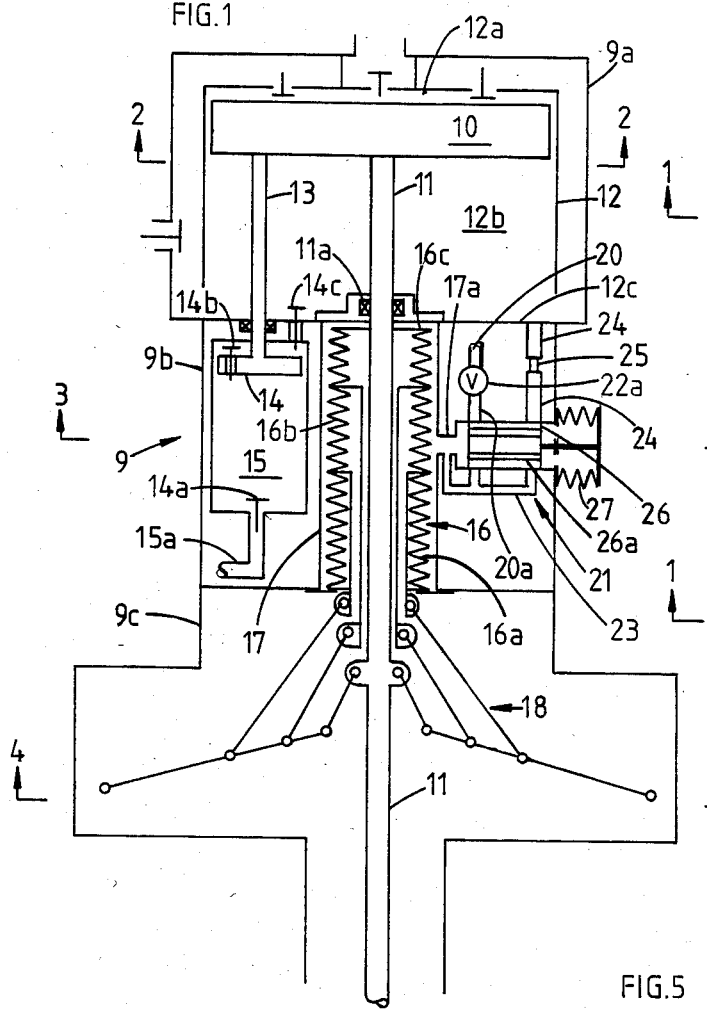
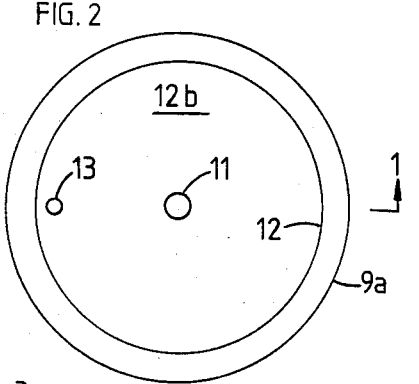
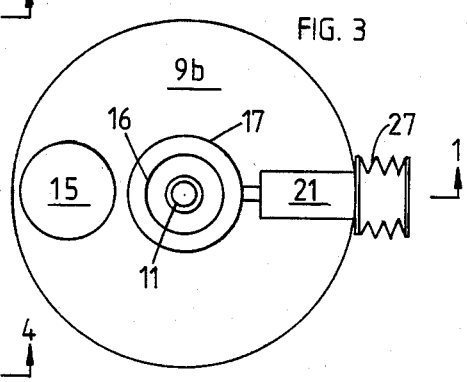
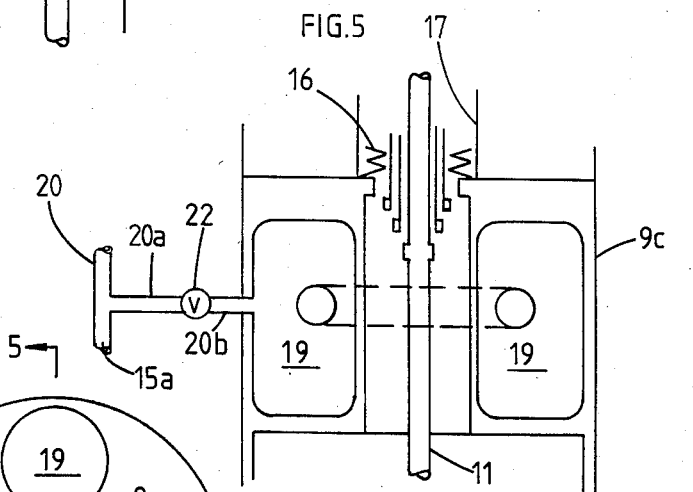
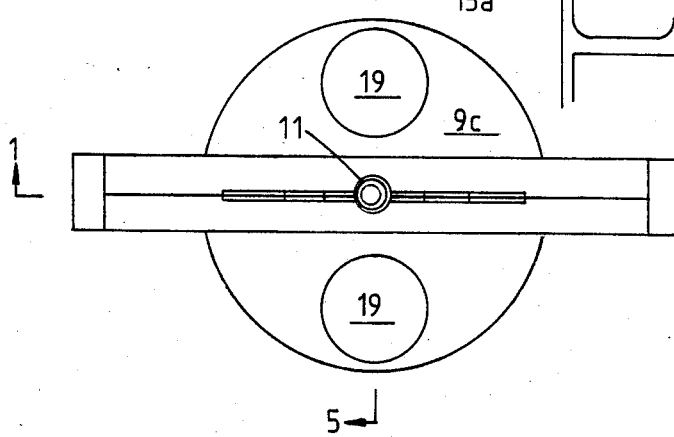

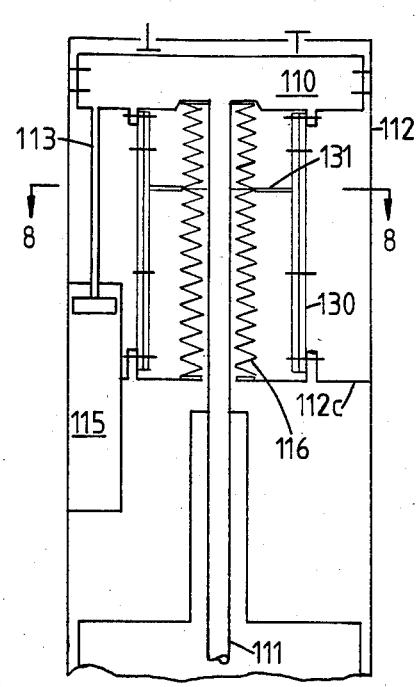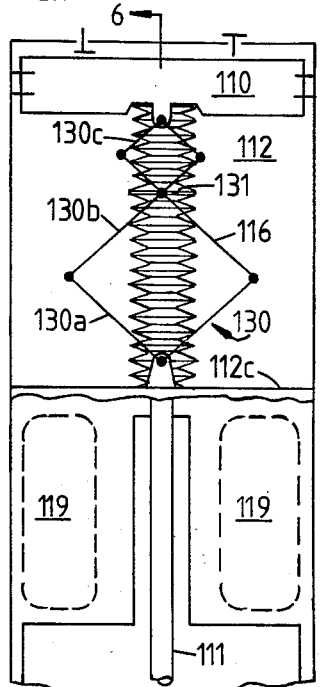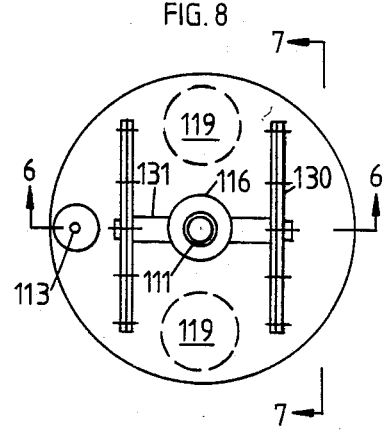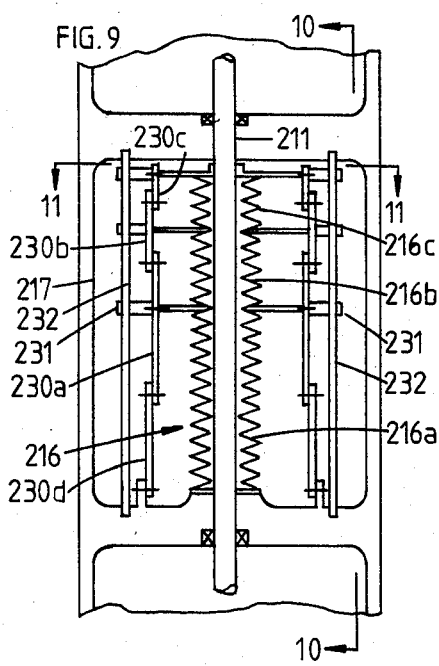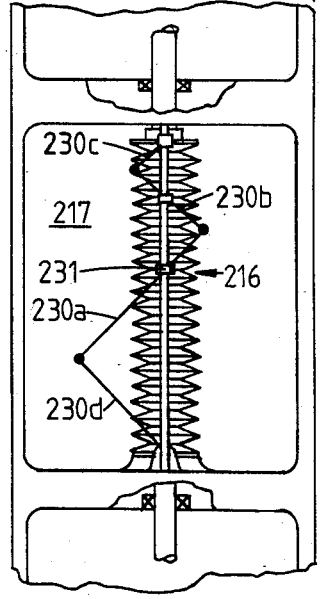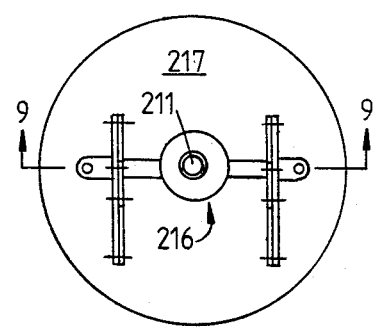

BELLOWS SEAL

This invention relates to hermetic type seals for reciprocating shaft mechanisms.

The invention is of general utility but of particular utility in sterling engines and heat pump apparatus or systems wherein loss of refrigerant vapor or system gas is to be avoided. With the system operating or at rest, the high vapor pressure of the refrigerant results in leakage through conventional shaft seals. A diaphragm or a bellows seal avoids such leakage. However, for example, the high pressure on the outer surface of a thin flexible bellows, the interior of which is at ambient or atmospheric pressure, in combination with the stresses caused by the expansion and contraction of the bellows, causes distortion and rapid failure of the seal.

The present invention avoids this and other difficulties and disadvantages by providing means for controlling the pressure differential between the inside and outside of flexible seals, such as the inside and outside of a bellows type of seal, and by keeping maximum stress levels in each section caused by expansion and contraction to a minimum by appropriate division of the bellows and proper selection of the number of convolutions in each section and appropriate selection of the driving means for each section, as will now be described.

Figure 15:
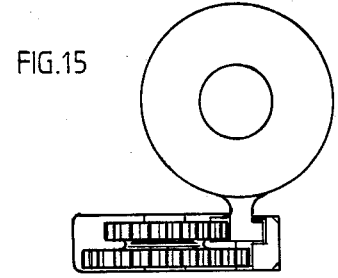
Figure 13:
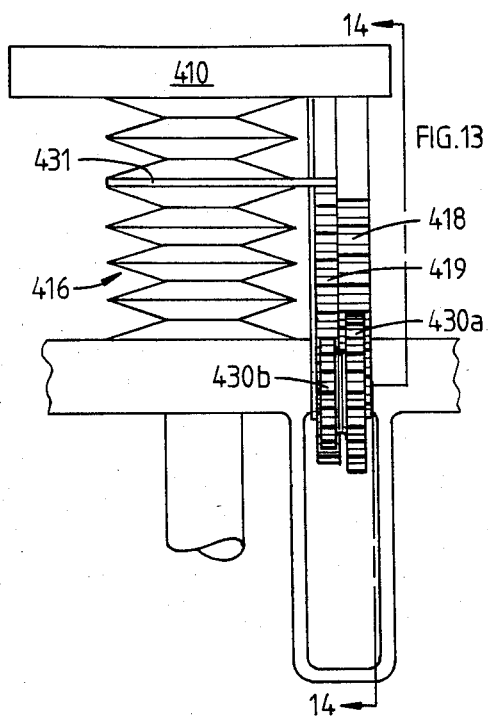
Figure 14:
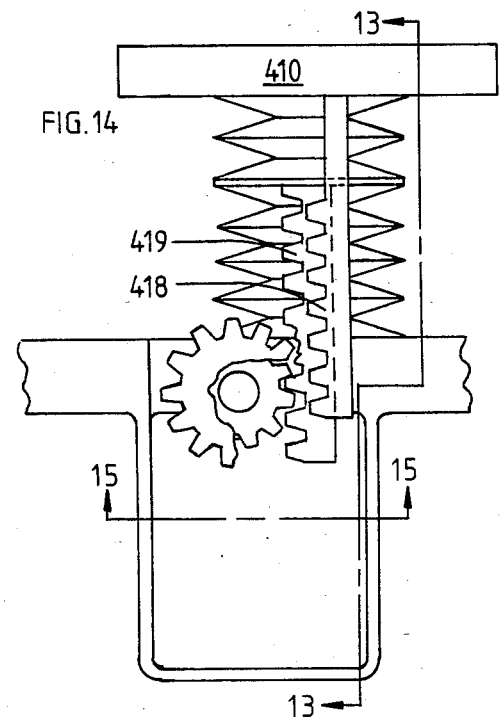
Figure 16:
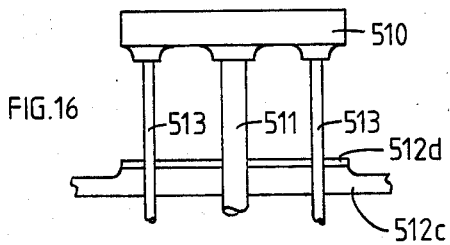

In the drawing,

FIG. 1 is a schematic longitudinal section taken at Section 1—1 of FIGS. 2-4 showing one embodiment of the invention as applied to the compressor mechanism of a heat pump, FIGS. 2, 3 and 4 are partial sectional views taken at sections 2—2, 3—3 and 4—4 of FIG. 1, FIG. 5 is a partial sectional elevation at Section 5—5 of FIG. 4, FIG. 6 is a schematic longitudinal section of a second embodiment of the invention taken at Section 6—6 of FIG. 8, FIG. 7 represents Section 7—7 of FIG. 8, FIG. 8 represents Section 8—8 of the structure of FIG. 6, FIG. 9 is a schematic longitudinal section of another embodiment of the invention, FIG. 10 is a section taken at line 10—10 of FIG. 9, FIG. 11 is a section taken along Line 11—11 in FIG. 9, FIG. 12 is a partial sectional view of a further embodiment of the invention, FIG. 13 is a schematic view of another embodiment, FIG. 14 is a sectional view taken along line 14—14 in FIG. 13, FIG. 15 is a sectional view taken along line 15—15 in FIG. 14, and FIG. 16 is a fragmentary view of a compressor piston having two shafts for driving auxiliary pumps.

In FIGS. 1-5, piston 10 on shaft 11 operates within a cylinder 12 in a housing section 9a and actuates a sub-shaft 13 connected to a piston 14 of a sub-ambient or vacuum pump 15. Bellows 16, within a chamber 17, is sealed at its upper end to shaft 11 and at its lower end to a wall extending between chamber 17 and housing wall 96 and forms a hermetic seal between chamber 12b and the ambient atmosphere in the bellows which, through it's open end, is exposed to ambient pressure in housing section 9c. The bellows operates concurrently with the shaft, which extends through a gland type of seal 11a in the wall 12c, and maximum mechanical stress due to expansion and contraction of the convolutions of the bellows are drastically reduced by a lever and tube apparatus 18 in housing section 9c, as described in my copending application, Ser. No. 06/174,201 and filed July 31, 1980, now abandoned, and continuation application Ser. No. 06/392,457, now U.S. Pat. No. 4,424,008.

Stresses normally introduced by differential pressure are neutralized in accordance with one of the principles of this invention, as will now be described.

The pump 15 is connected to sub-ambient pressure or vacuum chamber or chambers 19 through passageway or line 15a, valve 22 and a check valve 14a. Vacuum established during operation of the machine is maintained in chamber 19 during shutdown by closing valve 22. The chamber 19 need be only large enough to provide for the starting of the engine, as described hereinafter. The pump needs only to have enough capacity to provide sufficient vacuum to relieve excessive pressure in chamber 17 during operation of the engine and to quickly store a vacuum in chamber 19 for starting purposes in case the compressor is subject to short periods of operation. A line 20 connects chamber 19 to a sleeve or plunger valve 21. Valve 21 connects with the bellows chamber 17 through a manifold 23 and line 17a and with cylinder chamber 12b through line 24 which is restricted by an orifice 25. A plunger or piston 26, which has at least one bore 26a therethrough, is self-adjusting to variations in pressure around bellows 16 through bore or bores 26a by a rod connection with a control bellows 27 located in housing section 9b or 9c or in the atmosphere.

During rest periods, piston 10 is forced to the expansion or lower position by the pressure of the gas or refrigerant in chamber 12a, and the bellows 16 is compressed and may be exposed to full gas or vapor pressure, due to leaking by seal 11a and plunger 26. At startup, valve 22 is opened causing the pressure around bellows 16 to be immediately reduced approximately to ambient. During operation of the compressor, high pressure in the bellows 27 causes the valve 21 to open line 20a to the vacuum chamber, which is kept evacuated by the pump 15; low pressure in bellows 27 conversely causes valve 21 to shut off or close line 20a and connect chamber 17 through manifold 23, line 24 and orifice 25 to the higher pressure chamber 12b, and the pressure around bellows 16 is thus maintained substantially ambient.

The lines 15a and 20 in FIG. 1 connect with the lines 15a and 20 in FIG. 5 and the valve 26 is illustrated as being in its neutral position across both lines 20a and 24. In operation, plunger or piston 26 will constantly move back and forth as the bellows 27 responds to increases and decreases in pressure in chamber 17. The pressure in 12b will always be some what higher than ambient or atmospheric, inside of bellows 16 and housing section 9c, due to vapor pressure of the refrigerant being pumped, the principal use of the invention.

While the primary function of the pump and vacuum chambers is to relieve pressure in chamber 17 to approximately that in the bellows, residual vacuum in the chambers 19 is also useful in starting the engine/compressor. A line (not shown) to chamber 12a from the vacuum chambers may be briefly opened to lower the cylinder pressure and draw the piston 10 toward its compressor top dead center position, which action also puts a charge in the cylinder of the prime mover. The closing of the line, thus allowing the vapor pressure in chamber 12a to build up again, will aid in the return of piston 10 back toward its bottom dead center position, thereby compressing the charge in the prime mover sufficiently for firing. Means may be provided to move the piston in either or both directions for starting purposes, and a positive (soft) seal may be provided around shafts 11 and 13 and check valve 14c and line 24 to prevent leakage when the compressor is at rest to reduce the size or eliminate the need for chambers 19.

It will be seen that the entire apparatus may be self-contained with vacuum pump, plunger valve and vacuum chambers all located within the housing of the compressor which, however, is of somewhat extended length in the form of FIGS. 1–5. A more compact modification is shown in FIGS. 6–8. Here the bellows 116 is sealed directly to the piston 110 and to the lower end wall 112c of the cylinder 112. The action of the bellows is controlled by a lazytongs 130 of crossed links 130a, 130b and 130c, attached to a support ring 131, extending from convolutions of the bellows. Crossed links 130a are normally long for large intervals and links 130c are short for shorter intervals. Vacuum pump 115 evacuates vacuum chambers 119, which may have connections through appropriate valves and lines (not shown) to the cylinder 112 above and below piston 110 in a manner and for purposes already described with respect to FIGS. 1–6.

A second principle of the invention lies in having the number of identical convolutions in each of a plurality of sections of the bellows seal decrease sequentially from the fixed end of the bellows to the movable end thereof according to the formula:

$$\frac{N_2}{N_T} = \frac{S_2}{S_T}$$

Where $N_2$ is the number of convolutions in one of a plurality of sections of a bellows, $N_T$ is the total number of identical convolutions in the entire bellows, $S_2$ is the amount of elongation or contraction of the section, $S_T$ is the total elongation or contraction of the entire bellows during operation of the machine in which the seal is used.

Another advantage of the system of FIGS. 6–8 lies in the reduced diameter of the bellows, made possible by placing the mechanism for actuating the intermediate portion or portions of the bellows on the outside of the bellows.

Since the pressure on the outside and inside surfaces of the bellows is regulated by the action of the plunger valve 21 to approximately ambient and since a significantly lower pressure is maintained by the pump 115 in the vacuum chambers, startup is easily accomplished as previously indicated.

Another embodiment of the invention is shown in FIGS. 9–11. It has a bellows seal arrangement similar to that of FIGS. 1–5 but having unequal length bellows sections 216a, 216b and 216c with unequal length levers 230a, 230b and 230c for the actuating mechanism between the piston rod and the cylinder. The intermediate portions of the bellows are connected to short guide sleeves 231 that are slidable on guide rods 232.

A still further embodiment of the invention is shown in FIG. 12 wherein bellows 316 is connected to the compressor piston, and intermediate portions of the bellows are connected to externally located driving links through short guide sleeves around movable guide rods 332 connected to piston 310 on opposite sides of the bellows. This provides a more compact arrangement than in the modification of FIGS. 9–11.

The modification of FIGS. 13–15 makes use of a pair of racks, one, 418, connected to piston 410 and the other, 419, connected to intermediate portion 431 of the bellows 416 and a large diameter gear 430a engaging rack 418 and an integral or attached smaller diameter gear 430b engaging the rack 419. This arrangement provides the same relative movements between the bellows sections as in the other modifications.

FIG. 16 shows how a compressor piston 510 may be designed to actuate pump shafts 513 through a cylinder end wall 512c and seat on a soft pad 512d to prevent leakage through the wall around the shafts and piston rod.

It is to be understood that other modifications of the invention could have the ambient pressure on the outside of the bellows seal with the inside being exposed to the variable pressure and controlled in a similar manner. Also, in some applications of the invention, it may be desirable to have a differential in pressures other than ambient on opposite sides of the bellows seal so long as they are controlled pressures.

What is claimed is as follows:

1. Control apparatus for a bellows seal on a reciprocable shaft comprising means for substantially balancing gas pressures on the inside and the outside surfaces of the bellows seal, means for dividing convolutions of the bellows seal into a plurality of sections of unequal numbers of convolutions which sections decrease in number of convolutions sequentially from a fixed end of the bellows seal to a movable end thereof, and movable driving means extending between said shaft and said movable end and between said shaft and the means dividing the convolution sections to concurrently actuate said movable driving means when said shaft is moved so as to elongate or shorten the length of each section an amount substantially proportional to the number of convolutions in each section.

2. Control apparatus as defined in claim 1, wherein the ratio of the number of convolutions in any bellows section to the total number of convolutions is substantially equal to the ratio of the elongation or contraction of any bellows section to the total elongation or contraction of the bellows.

3. Control apparatus as defined in claim 1, wherein said means for actuating intermediate sections of said bellows includes racks and pinions.

4. Control apparatus as defined in claim 1, wherein said bellows seal has one end thereof sealingly connected to a compressor piston and the other end thereof sealingly connected to the wall of a cylinder surrounding said piston.

5. Control apparatus as defined in claim 1, wherein said means for balancing gas pressures includes means for varying the pressure on at least the higher pressure side of said bellow's convolutions.

6. Control apparatus for a bellows-type of hermetic seal around a reciprocable shaft, said seal having a fixed open end and a movable end and having an inside surface exposed to ambient pressure around said apparatus and an outside surface and being contained within a pressure chamber providing external pressure on said seal and being subject to potentially harmful differentials between external pressures and internal pressures, said apparatus comprising a first means for establishing a sub-ambient pressure and valve means for connecting said sub-ambient pressure in said first means to one of said surfaces when pressure thereon is higher than desired with respect to the pressure on the other side, whereby each of the pressures inside and outside of said bellows seal is maintained at its desired level and means to concurrently actuate said movable end and an intermediate portion of the seal.

7. Control apparatus as defined in claim 6, wherein said first means comprises an evacuating pump.

8. The apparatus of claim 6, wherein said shaft is attached to a piston in a compression cylinder and said cylinder serves as said chamber.

9. Control apparatus as defined in claim 6, wherein said one of said surfaces is the outside surface of said seal.

10. Control apparatus as defined in claim 6, wherein said shaft extends through a gland-type of seal into said pressure chamber.

11. Apparatus as defined in claim 6, wherein said shaft is attached to a piston of a compressor and said valve means is movable to connect said one surface to a source of higher pressure when the pressure on said one surface is lower than a desired pressure with respect to the other side.

12. The apparatus of claim 11, wherein said first means comprises a reciprocating evacuating pump having a shaft parallel to and reciprocating with said reciprocating shaft and being connected to a lower than ambient pressure chamber.

13. Apparatus as defined in claim 11, wherein said piston is operably connected to said first means.

14. The apparatus system of claim 6, wherein said bellows includes a plurality of intermediate concurrently actuated portions dividing said bellows into sections of convolutions.

15. The apparatus as defined in claim 14, wherein said actuating means comprises a lazytongs type of mechanism extending between said piston and a partition wall of said cylinder and being attached to at least one of the intermediate portions of said bellows.

16. Control apparatus as defined in claim 15, wherein axially spaced pairs of lazytong links are of different lengths.

17. Control apparatus as defined in claim 6, wherein said valve means is controlled by means responsive to pressure on said one side of said bellows.

18. Control apparatus as defined in claim 17, wherein said valve means is operable to connect said one side of said seal to either said first means or to a higher than ambient pressure source.

* * * * *